UNITED STATES PATENT OFFICE 2,678,315

PREPARATION OF CYANO DERIVATIVES OF AMIC ACIDS AND PRODUCTS

Marvin R. Frederick, Wadsworth, Ohio, assignor to The B. F. Goodrich Company, New York, N. Y., a corporation of New York No Drawing. Application December 16, 1950, Serial No. 201,237

16 Claims. (Cl. 260—281)

This invention relates to a method for the preparation of cyano derivatives of amic acids, many of which derivatives are new compounds, and pertains more particularly to the preparation of such compounds by the reaction of beta-lactones with alpha-cyano monocarboxylic acid amides.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

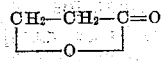

is economically obtained from ketene and formaldehyde. The ease with which beta-lactones are now obtained makes it desirable to use these compounds as starting materials in the synthesis of many valuable compounds including the cyano derivatives of amic acids.

It has now been discovered that saturated aliphatic beta-lactones react with alpha-cyano monocarboxylic acid amides which possess the structure

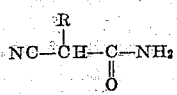

wherein R is hydrogen or an alkyl radical at the reactive hydrogen atom on the alpha carbon of the cyano acid in such a manner that the beta-carbon atom of the beta-lactone attaches to the alhpa carbon atom of the amide to form aliphatic cyano derivatives of amic acids. These compounds are believed not to have been prepared heretofore. Also, an additional linkage of the carbonyl carbon atom of the beta-lactone to the amido nitrogen atom may occur simultaneously with the linkage of the beta-carbon atom of the beta-lactone to the alpha carbon atom of the amide, in which event an alicyclic cyano derivative of an amic acid, that is, a 3-cyanoglutarimide, is formed. The 3-cyanoglutarimides may be readily hydrolyzed to give aliphatic cyano derivatives of amic acids, which are also believed to be new compounds.

Either an aliphatic or an alicyclic compound may be obtained as the principal product of the reaction between a beta-lactone and an alpha-cyano monocarboxylic acid amide depending upon the conditions under which the reaction is carried out. For example, when the reaction is carried out in aqueous solution and in the presence of an alkaline catalyst the salt of an aliphatic cyano-substituted amic acid is formed, from which the free acid is readily obtained by acidification. When the reaction is carried out in a substantially anhydrous medium such as in solution in an alcohol which is a solvent for the amide and in the presence of an alkali metal catalyst an alicyclic 3-cyanoglutarimide is obtained. Such an alicyclic compound is readily converted to an aliphatic cyano-substituted amic acid by a simple alkaline hydrolysis process. The compounds obtained by the hydrolysis process are new chemical compounds.

The above-described reactions are believed to proceed substantially as follows:

I. Aqueous medium with alkaline catalyst

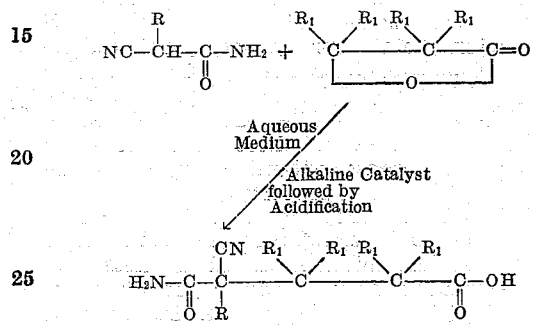

II. Anhydrous medium with alkali metal catalyst

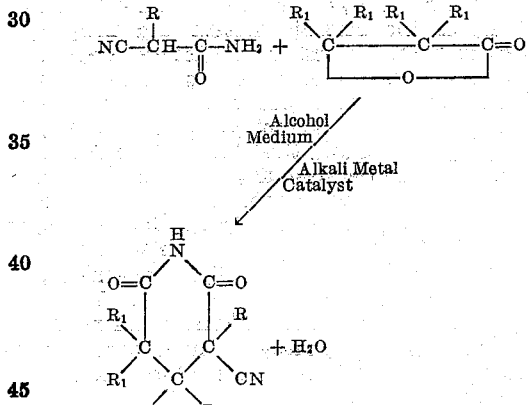

III. Alkaline hydrolysis

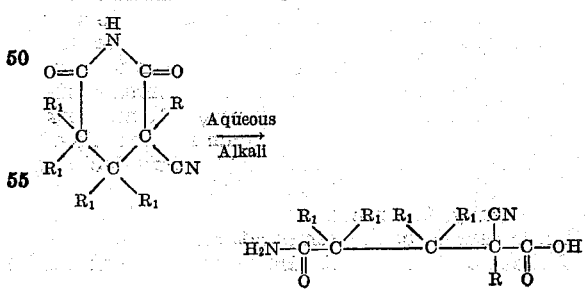

In the above reaction equations R represents hydrogen or a lower alkyl radical and $R_1$ represents hydrogen or an alkyl radical.

Typical alpha-cyano monocarboxylic acid amides having the structure shown hereinabove and which react with beta-lactones in accordance with this invention include cyanoacetamide, alpha-cyano propionamide, alpha-cyano butyramide, alpha-cyano valeramide, alpha-cyano caproamide, alpha-cyano caprylamide, alpha-cyano pelargonamide, alpha-cyano capramide and the like. Especially preferred are those alpha-cyano monocarboxylic acid amides in which the radical R is hydrogen or a lower alkyl radical such as methyl, ethyl, propyl or butyl.

For the reason that it is most readily obtainable in commercial quantities and at relatively low cost, beta-propiolactone is the preferred beta-lactone for use in the present process. However, other saturated aliphatic beta-lactones which possess the structure

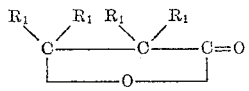

wherein each R is a member of the class consisting of hydrogen and lower alkyl radicals may also be used advantageously. Typical examples of such beta-lactones include in addition to beta-propiolactone, beta-butyrolactone, beta-isobutyrolactone, beta-n-valerolactone, beta-isovalerolactone, beta-isopropyl-beta-propiolactone, beta-ethyl-beta-butyrolactone, alpha-methyl-beta-propiolactone, alpha, alpha-dimethyl-beta-propiolactone, and the like. Of these beta-lactones there are preferred those which are water soluble; beta-lactones containing from 3 to 6 carbon atoms possess this property.

In carrying out the reaction of beta-lactones with alpha-cyano monocarboxylic acid amides in aqueous alkaline solution, any alkali metal hydroxide such as sodium hydroxide, potassium hydroxide and the like, or other alkaline material may be utilized. When the reaction is carried out in alcohol solution any of the alkali metals may be used as catalysts. These metals occur in group 1A of the periodic system and include lithium, sodium, potassium, rubidium, cesium and virginium. In practice, it is preferred that the alkali metal be dissolved in an alcohol solvent therefor such as ethanol, propanol, butanol, hexanol, 2-propanol and the like. By the use of a solvent for the catalyst the formation of an alkali metal derivative, a probable intermediate in the reaction of this invention, is facilitated. The quantity of catalyst utilized is not critical and may be varied considerably. In general, however, it may be stated that it is desirable to utilize from 0.5 to 2.0 moles of the alkali metal for each mole of the alpha-cyano monocarboxylic acid amide although larger or smaller amounts may be utilized if desired.

The quantity of the beta-lactone utilized is also not critical. Accordingly, the lactone and the alpha-cyano monocarboxylic acid amide may be brought together in equimolar quantities, the amount stoichiometrically required for the reaction to occur or if desired a stoichiometric excess of either reactant may be used. It has been found, however, that the optimum molar ratio of alpha-cyano monocarboxylic acid to beta-lactone to catalyst is approximately 1:1:1.

Generally, the reaction of the present invention is carried out at temperatures in the range of about 0° C. to 80° C. However, temperatures below 0° C. and higher than 80° C. are also operative although the yields obtained are not so high as those obtained when the preferred temperatures are employed.

The following specific examples are intended to illustrate more fully the process of this invention, but are not intended to be construed as limiting the scope thereof, for there are, of course, numerous possible variations and modifications. In the examples all parts are by weight.

Example I 46 parts (2 moles) of sodium are added rapidly to 945 parts of absolute ethyl alcohol and the solution is cooled to about 35° C. 189 parts (2.25 moles) of cyanoacetamide are then added to the resulting solution with vigorous stirring until the cyanoacetamide becomes well dispersed (about 30 minutes). While continuing the stirring 144 parts (2 moles) of beta-propiolactone are added over a 30 minute period and the reaction mixture allowed to digest for 2 hours at a temperature in the range of 35°-50° C. The reaction mixture is then acidified with 113 parts (1.1 mole) of concentrated sulfuric acid and the crystalline product which forms is removed by filtration, washed and recrystallized from water, whereupon 34 parts of 3-cyanoglutarimide (M. P. 207-8° C.; Nitrogen analysis; theoretical value 20.3%; found 20.4%) are obtained.

Example II

Example I is repeated except beta-isovalerolactone is substituted for beta-propiolactone. 4,4-dimethyl-3-cyanoglutarimide, a white solid, is obtained in good yield.

Example III

Example I is repeated except that alpha-cyano propionamide is substituted for cyanoacetamide. 3-methyl-3-cyanoglutarimide is obtained in substantial yield, although the yield is not as high as that secured in Example I.

Example IV 8.9 parts (0.05 mole) of 3-cyanoglutarimide are dissolved in 50 parts of water containing 2 parts (0.05 mole) of sodium hydroxide. The solution is heated at 50° C. for one hour, cooled to 25° C. and acidified, whereupon a crystalline product separates. The solid material is removed by filtration. 4.5 parts (59%) of 2-cyanoglutaramic acid (M. P. 140°-145° C. with gas evolution) are obtained after recrystallization from alcohol and water.

Example V

A suspension of 168 parts (2 moles) of cyanoacetamide in a solution of 80 parts (2 moles) of sodium hydroxide in 600 parts of water is prepared and maintained at 15° C. The suspension is then stirred for 5 minutes, cooled to 5° C. and 144 parts (2 moles) of beta-propiolactone are added whereupon the temperature rises to 72° C. After 30 minutes the solution is cooled to 20° C. and acidified with 113 parts of concentrated sulfuric acid. Upon filtration 50 parts of 4-cyanoglutaramic acid (M. P. 168°-170° C. with gas evolution) are obtained.

| Analysis | Calculated for $C_6H_8O_3N_2$ | Found |
|---|---|---|
| Percent C | 46.02 | 46.06 |
| Percent H | 5.13 | 5.35 |
| Percent N | 17.95 | 17.74 |
| Neut. Equiv | 156.0 | 158.0 |

Moreover, when the above examples are repeated utilizing other of the alpha-cyano monocarboxylic acid amides or other of the beta-lactones listed hereinabove useful cyano derivatives of amic acids are again obtained. For example, alpha cyano propionamide is reacted with beta-butyrolactone in an aqueous alkaline solution to give an amic acid of the structure

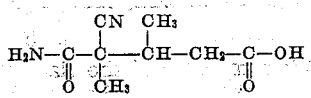

and when the same reaction is carried out in alcohol solution and in the presence of an alkali metal catalyst a 3 - cyanoglutarimide of the structure

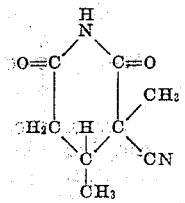

is obtained.

The aliphatic cyano-substituted amic acids prepared by the method of this invention are very valuable compounds. For example, they are useful as medicinal intermediates and as intermediates in the preparation of various chemical compounds for many other purposes. They are also of value in the fields of insecticides, fungicides and herbicides as well as for many other purposes.

While specific embodiments of the invention have been disclosed herein, it is not intended to limit the invention solely thereto, for it is obvious that many modifications, including substitution of equivalent materials and variations in the proportions of materials used are within the spirit and scope of the invention as defined in the appended claims.

I claim:

1. The method which comprises bringing together in the presence of an alkaline material a beta-lactone of the formula

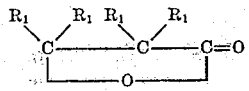

wherein each $R_1$ is a member of the class consisting of hydrogen and lower alkyl radicals, and an alpha-cyano monocarboxylic acid amide of the formula

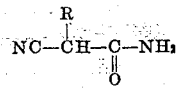

wherein R is a member of the class consisting of hydrogen and alkyl radicals, thereby to obtain a cyano derivative of an amic acid.

2. The method which comprises bringing together in the presence of an alkali metal catalyst dissolved in an alcohol solvent therefor a beta-lactone of the formula

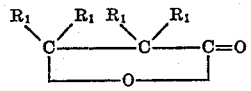

wherein each $R_1$ is a member of the class consisting of hydrogen and lower alkyl radicals, and an alpha-cyano monocarboxylic acid amide of the formula

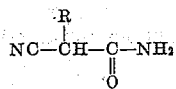

wherein R is a member of the class consisting of hydrogen and alkyl radicals, thereby to obtain a compound of the formula

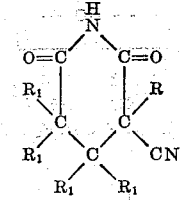

wherein R and $R_1$ have the same significance as above.

3. The method which comprises bringing together in the presence of an alkali metal catalyst dissolved in an alcohol solvent therefor beta-propiolactone and an alpha-cyano monocarboxylic acid amide of the formula

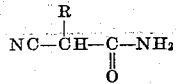

wherein R is a member of the class consisting of hydrogen and lower alkyl radicals, thereby to obtain a compound of the formula

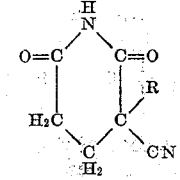

wherein R has the same significance as above.

4. The method of claim 3 wherein the alpha-cyano monocarboxylic acid amide is cyanoacetamide, the catalyst sodium, and the alcohol solvent is ethanol, the product obtained being 3-cyanoglutarimide.

5. The method which comprises bringing together in the presence of an alkali metal catalyst a beta-lactone of the formula

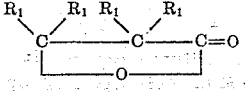

wherein each $R_1$ is a member of the class consisting of hydrogen and lower alkyl radicals, and an alpha-cyano monocarboxylic acid amide of the formula

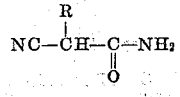

wherein R is a member of the class consisting of hydrogen and alkyl radicals, thereby to obtain a 3-cyanoglutarimide of the structure

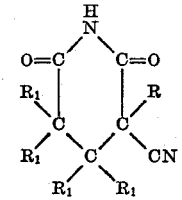

and hydrolyzing said 3-cyanoglutarimide, thereby to obtain a 2-cyano derivative of an amic acid.

6. The method of claim 5 wherein the beta-lactone is beta-propiolactone and the amide of an alpha-cyano monocarboxylic acid is cyanoacetamide, the product obtained being 2-cyanoglutaramic acid.

7. The method which comprises bringing together in aqueous alkaline solution a beta-lactone of the formula

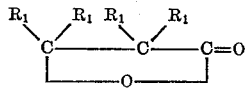

wherein each $R_1$ is a member of the class consisting of hydrogen and lower alkyl radicals, and an alpha-cyano monocarboxylic acid amide of the formula

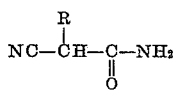

wherein R is a member of the class consisting of hydrogen and alkyl radicals, and then acidifying the reaction mixture thereby to obtain a compound of the formula

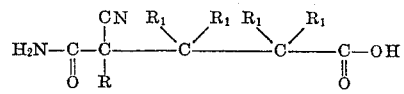

wherein R and $R_1$ have the same significance as above.

8. The method of claim 8 wherein the beta-lactone is beta-propiolactone, the compound recovered possessing the formula

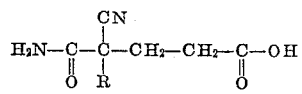

wherein R is a member of the class consisting of hydrogen and alkyl radicals.

9. The method which comprises bringing together beta-propiolactone and cyanoacetamide in aqueous alkaline solution, and then acidifying the reaction mixture, thereby to obtain 4-cyanoglutaramic acid.

10. As new chemical compounds, acids of the formula

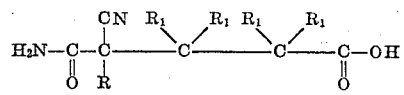

wherein R is a member of the class consisting of hydrogen and saturated alkyl groups having from 1 to about 8 carbon atoms and each $R_1$ is a member of the class consisting of hydrogen and saturated lower alkyl radicals.

11. As new chemical compounds, acids of the formula

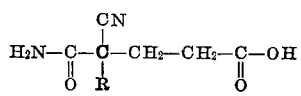

wherein R is a member of the class consisting of hydrogen and saturated alkyl groups having from 1 to about 8 carbon atoms.

12. 4-cyanoglutaramic acid.

13. As new chemical compounds, acids of the formula

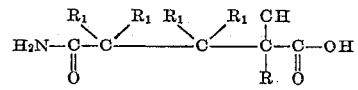

wherein R is a member of the class consisting of hydrogen and saturated alkyl groups having from 1 to about 8 carbon atoms and each $R_1$ is a member of the class consisting of hydrogen and saturated lower alkyl radicals.

14. As new chemical compounds, acids of the formula

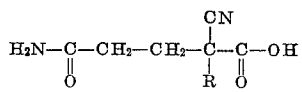

wherein R is a member of the class consisting of hydrogen and saturated alkyl groups having from 1 to about 8 carbon atoms.

15. 2-cyanoglutaramic acid.

16. The method which comprises bringing together in the presence of an alkaline catalyst and a solvent for the reaction mixture (1) a beta-lactone of the formula

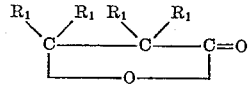

wherein each $R_1$ is a member of the class consisting of hydrogen and lower alkyl radicals, and (2) an alpha-cyano monocarboxylic acid amide of the formula

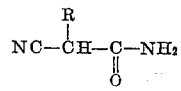

wherein R is a member of the class consisting of hydrogen and alkyl radicals, said solvent having the general formula YOH, wherein Y is a member of the class consisting of hydrogen and saturated lower alkyl radicals free of active methylene groups, thereby to obtain a cyano derivative of amic acid.

References Cited in the file of this patent

UNITED STATES PATENTS

| Number | Name | Date |
|---|---|---|
| 2,391,251 | Long | Dec. 18, 1945 |
| 2,396,626 | Wiest et al. | Mar. 12, 1946 |
| 2,460,536 | Rogers | Feb. 1, 1949 |
| 2,505,459 | Bruson et al. | Apr. 25, 1950 |
| 2,506,050 | Warner et al. | May 2, 1950 |

OTHER REFERENCES

Barthe, Beilstein (Handbuch, 4th ed.), vol. II, p. 814 (1920).